US012470887B2

(12) United States Patent
More et al.

(10) Patent No.: US 12,470,887 B2
(45) Date of Patent: Nov. 11, 2025

(54) GENERATOR SET VISUALIZATION AND NOISE SOURCE LOCALIZATION USING ACOUSTIC DATA

(71) Applicant: Cummins Power Generation Inc., Minneapolis, MN (US)

(72) Inventors: Shashikant Ramdas More, Coon Rapids, MN (US); William S. Bederaux-Cayne, Columbus, IN (US); William C. Tuttle, Columbus, IN (US); Harshalkumar Chimanbhai Patel, Seymour, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 120 days.

(21) Appl. No.: 18/285,226

(22) PCT Filed: Mar. 30, 2022

(86) PCT No.: PCT/US2022/022607
§ 371 (c)(1),
(2) Date: Sep. 29, 2023

(87) PCT Pub. No.: WO2022/212551
PCT Pub. Date: Oct. 6, 2022

(65) Prior Publication Data

US 2024/0187810 A1 Jun. 6, 2024

Related U.S. Application Data

(60) Provisional application No. 63/168,586, filed on Mar. 31, 2021.

(51) Int. Cl.
*H04S 7/00* (2006.01)

(52) U.S. Cl.
CPC ................ *H04S 7/303* (2013.01); *H04S 7/40* (2013.01); *H04S 2400/11* (2013.01)

(58) Field of Classification Search
CPC ........ H04S 7/303; H04S 7/40; H04S 2400/11; H04S 7/305
(Continued)

(56) References Cited

U.S. PATENT DOCUMENTS 8,965,002 B2 * 2/2015 Oh ...................... G10L 21/0208 367/118
9,591,411 B2 * 3/2017 Jensen .................. H04R 3/002
(Continued)

FOREIGN PATENT DOCUMENTS

CN 102508989 A 6/2012
CN 102622268 A 8/2012
(Continued)

OTHER PUBLICATIONS

International Search Report and Written Opinion on PCT/US2022/022607 dated Jul. 18, 2022 (16 pages).
(Continued)

*Primary Examiner* — Thjuan K Addy
(74) *Attorney, Agent, or Firm* — Foley & Lardner LLP

(57) ABSTRACT

A method of product visualization and acoustic noise source localization includes receiving acoustic data that is associated with a first product, mapping a sound field around the first product based on the acoustic data, and generating a 3D surface of the sound data for the first product based on the mapping by at least one of interpolating or extrapolating the sound field. The method further includes generating a simulation of the first product by combining the 3D surface with a visual representation of the first product, and providing,
(Continued)

via an emitter, an audio output based on the position of an avatar within the simulation with respect to a position of the first product.

20 Claims, 9 Drawing Sheets

(58) Field of Classification Search
USPC ............................... 381/1, 300, 309, 310, 26
See application file for complete search history.

(56) References Cited

U.S. PATENT DOCUMENTS

| | | | |
|---|---|---|---|
| 10,757,528 | B1 | 8/2020 | Mindlin et al. |
| 2006/0098827 | A1 | 5/2006 | Paddock et al. |
| 2013/0147835 | A1 | 6/2013 | Lee et al. |
| 2017/0256951 | A1 | 9/2017 | Crespo-Dubie et al. |
| 2017/0337938 | A1 | 11/2017 | Kim |
| 2018/0108334 | A1 | 4/2018 | Clement et al. |
| 2020/0142665 | A1 | 5/2020 | Dantrey et al. |
| 2020/0202626 | A1 | 6/2020 | Moody et al. |

FOREIGN PATENT DOCUMENTS

| | | | |
|---|---|---|---|
| CN | 202434104 | U | 9/2012 |
| CN | 107862930 | A | 3/2018 |
| CN | 108010413 | A | 5/2018 |
| DE | 19731724 | A1 | 1/1999 |
| KR | 20100128855 | A | 12/2010 |
| WO | WO-2017/027182 | A1 | 2/2017 |

OTHER PUBLICATIONS

Moravec et al., "Innovative Application Options of Sound Visualization Tools", International Council on Technologies of Environmental Protection (ICTEP), IEEE, Oct. 2019, pp. 191-194.

Examination Report on IN Appl. Ser. No. 202347067716 Dated Nov. 29, 2024 (6 pages).

* cited by examiner

| PROJECT #1 | |
|---|---|
| NAME | Ldn dB(A) |
| BEHIND WALL ON GROUND_RECEIVER 2 | 58.4 |
| CORNER OF WALL RECEIVER 1 | 76.7 |
| RECEIVER 3 | 73.8 |
| RECEIVER 4 | 61.9 |
| RECEIVER 5 | 55.0 |
| RECEIVER 6 | 59.7 |
| RECEIVER 7 | 72.6 |
| RECEIVER 8 | 67.5 |
| RECEIVER 9 | 62.9 |
| RECEIVER 10 | 83.4 |
| RECEIVER 11 | 90.0 |
| RECEIVER 12 | 82.9 |
| RECEIVER 13 | 77.1 |
| RECEIVER 14 | 78.2 |
| RECEIVER 15 | 76.8 |
| RECEIVER 16 | 49.3 |
| RECEIVER 17_20m | 58.3 |
| RECEIVER 18 | 81.9 |
| RECEIVER 19 | 87.7 |
| RECEIVER 20 | 77.5 |
| RECEIVER 21_20m | 77.9 |
| RECEIVER 22 | 76.3 |
| RECEIVER 23 | 77.3 |
| RECEIVER 24 | 76.1 |
| RECEIVER 26_20m | 72.5 |
| RECEIVER 27_258 METERS | 87.3 |

GENERATOR SET VISUALIZATION AND NOISE SOURCE LOCALIZATION USING ACOUSTIC DATA

CROSS-REFERENCE TO RELATED PATENT APPLICATIONS

This application is a National Stage Entry of International Application No. PCT/US2022/022607, filed on Mar. 30, 2022, which claims the benefit of and priority to U.S. Provisional Application No. 63/168,586, filed on Mar. 31, 2021, the contents of which are hereby incorporated by reference herein in their entireties.

TECHNICAL FIELD

The present disclosure relates to systems and methods for acoustic analysis and three dimensional visualization of industrial systems and products.

BACKGROUND

Industrial products such as engine systems, cooling systems, and exhaust systems generate noise that can vary depending on the characteristics of the products themselves, the surrounding environment and a user's position within the environment. These products may be designed to meet stringent noise standards, regulations, and/or specifications to minimize disruption in the field of use. These standards and/or specifications can vary widely between different technology areas, and may also depend on where/how the product(s) will be used.

SUMMARY

To ensure compliance with standards and/or specifications, product(s) must be vigorously tested in an environment that is designed to simulate how the product(s) will be used in the field.

One embodiment of the present disclosure relates to a method. The method includes receiving acoustic data that is associated with a first product, mapping a sound field around the first product based on the acoustic data, and generating a 3D surface of the sound data for the first product based on the mapping by at least one of interpolating or extrapolating the sound field. The method further includes generating a simulation of the first product by combining the 3D surface with a visual representation of the first product, and providing, via an emitter, an audio output based on the position of an avatar within the simulation with respect to a position of the first product.

Another embodiment of the present disclosure relates to a system for virtual product review and analysis. The system includes a communications interface configured to communicate with an emitter, a memory configured to store acoustic data associated with a first product, and a processor communicably coupled to the communications interface and the memory. The processor is configured to (i) receive the acoustic data; (ii) map a sound field around the first product based on the acoustic data; (iii) generate a first three-dimensional (3D) surface of the sound field for the first product based on the map by at least one of interpolating or extrapolating the sound field; (iv) generate a simulation of the first product by combining the 3D surface with a visual representation of the first product; and (v) provide, to the emitter, an audio output based on a position of an avatar in the simulation with respect to a position of the first product.

Yet another embodiment of the present disclosure relates to a non-transitory computer-readable medium configured to store a program which, when executed by a process, cause a device to (i) receive acoustic data associated with a first product; (ii) map a sound field around the first product based on the acoustic data; (iii) generate a first three-dimensional (3D) surface of the sound field for the first product based on the map by at least one of interpolating or extrapolating the sound field; (iv) generate a simulation of the first product by combining the 3D surface with a visual representation of the first product; and (v) provide, via an emitter, an audio output based on a position of an avatar in the simulation with respect to a position of the first product.

These and other features, together with the organization and manner of operation thereof, will become apparent from the following detailed description when taken in conjunction with the accompanying drawings.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
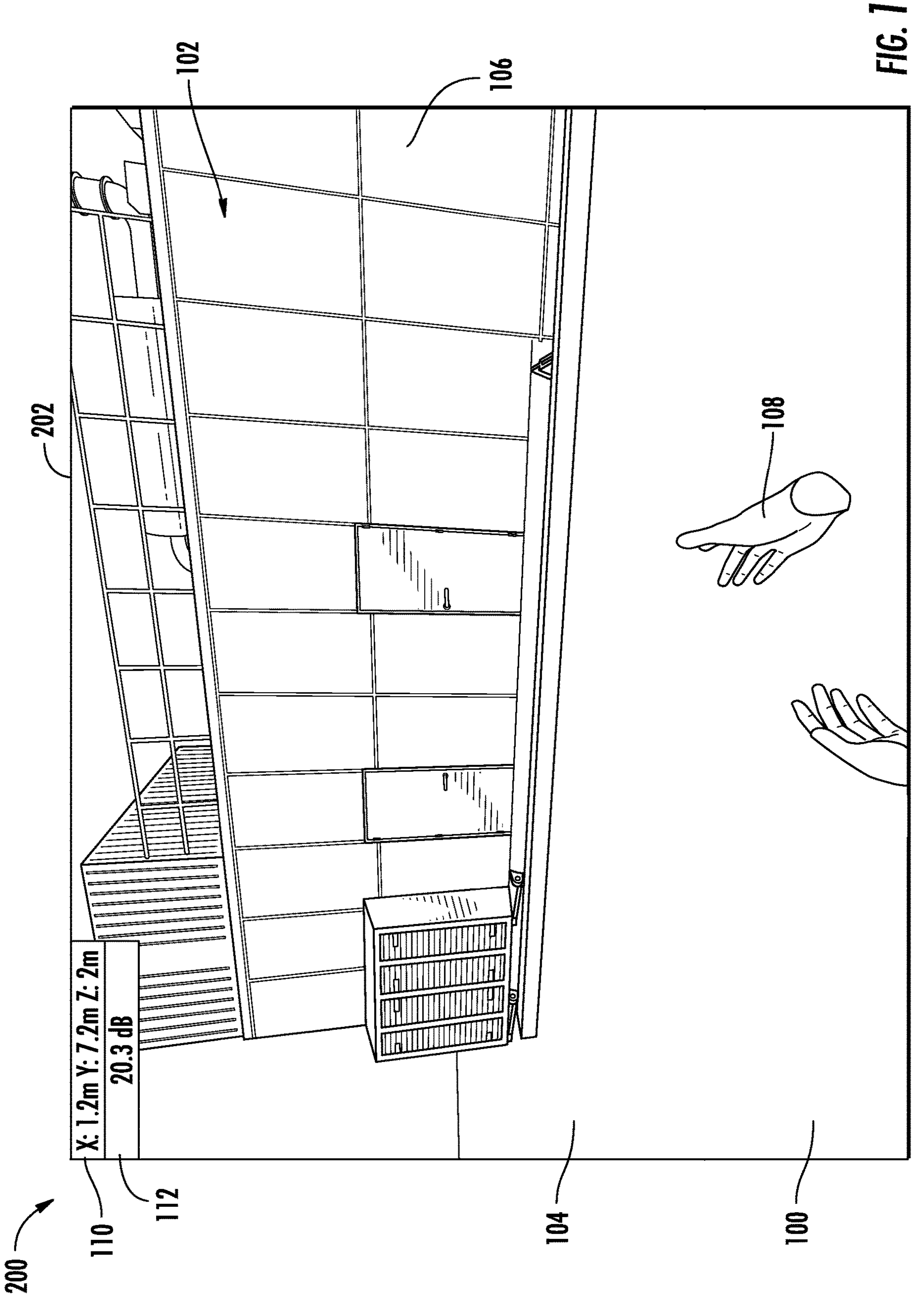
FIG. 1 is a front view of a display device of a virtual reality system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate to methods and systems for virtual product review and analysis. In particular, embodiments described herein relate to a virtual reality system for product visualization and acoustic noise source localization. The virtual reality system allows a user to evaluate the actual acoustic performance of a product in the planned environment of use.

In many technology areas, the noise levels produced by commercial and/or industrial equipment are limited based on local regulations and/or user-specific requirements (e.g., customer specifications, etc.). These requirements can vary significantly depending on the type of product and the application in which the product will be used. To evaluate product compliance, the noise levels produced by the product may be measured in a test facility that is specifically designed to minimize any imported noise from the surrounding environment, and to accurately capture the noise generated by the product. Additionally, because of the variability of regulations and different user requirements, the setup of the test facility (e.g., the position of the product and monitoring devices within the test facility) may also need to be modified for different applications in order to replicate the environment where the product will be used, and/or to determine the sound that will be produced by multiple products that are used together. For example, in one application, the noise levels from a single product (e.g., genset) may be of interest (e.g., the noise at a given distance, including but not limited to a distance of about 10 m from the product, etc.). In another application, the noise levels from a combined system with multiple products (e.g., gensets) in a specific arrangement may be of interest (e.g., at a distance including but not limited to a distance of about 5 m from the products), where each individual product contributes to the overall noise levels produced. While this method of quantifying product noise from the products themselves is very accurate, it is difficult for technicians to account for the various influences that the surrounding environment will have on actual values of exported noise. Moreover, entry to the test facility is limited to prevent interference with the sound measurements and damage to delicate monitoring equipment, among other reasons.

Further complicating matters, in some applications, a user (e.g., a customer) may be unsure of the exact performance that is required of the product(s), or the reasonableness of the noise level regulations that are implemented in their jurisdiction. As a result, the user may be forced to make modifications to the product(s) on site, after installation, to reduce or otherwise modify the noise levels, which can lead to additional design complexity and expense.

The virtual reality system (e.g., audio-video virtual reality (VR) system) of the present disclosure mitigates the aforementioned issues by providing a simulated test environment in which a user can navigate to assess how sound changes with position and the orientation of the user relative to the product(s). The virtual reality system utilizes sound data from experimental testing to simulate the noise levels generated by the product(s) and how those noise levels vary with position. In particular, the virtual reality system uses sound data from a plurality of sensors positioned around the product(s) to determine a sound field that varies spatially within the simulation. The virtual reality system then extrapolates and/or interpolates the sound field to generate a continuous or semi-continuous three-dimensional (3D) surface of the sound data. The virtual reality system combines a 3D visualization of the product(s) with the 3D surface to produce a simulation that a user can navigate to gain a better understanding of the real-world performance of the product(s).

In at least one embodiment, the virtual reality system includes a user interface (e.g., an I/O device, haptic device, etc.) that allows the user to control their position within the simulation and to interact with the product(s). For example, the user may be able to manipulate access panels, doors, and/or other components of the product in the same way as for an actual device construction. The virtual reality system may be configured to automatically update the simulation based on the change in product structure to demonstrate how the sound levels within the environment change. The virtual reality system may also be configured to modify the 3D sound field to account for the influence of structures in the environment surrounding the product(s) to simulate what the product(s) would sound like in a real-world setting. For example, the virtual reality system may be configured to account for the location of buildings, sound barriers, or other structural interference as well as the change in sound due to materials used in their construction (e.g., sound reflections, sound absorption, etc.).

In at least one embodiment, the virtual reality system is configured to allow a user to select different product(s), add or remove components, and/or change the position of products within the simulation. The virtual reality system may be configured to modify the visual representation and the 3D sound field to account for these changes (e.g., by superimposing the sound field from a first product onto the sound field from the second product, etc.). In at least one embodiment, the 3D sound field for an industrial system (e.g., genset, recreational vehicle (RV), or other noise producing assembly) may be produced by combining the sound data from the system's constituent components and/or computer aided design (CAD) surface geometry of the enclosure for the system.

In at least one embodiment, the virtual reality system is configured to present a visual indication of the localized sound field within the simulation and/or to allow manipulation of the sound field based on user inputs. For example, the virtual reality system may be configured to present a contour plot that the user can use to visually assess levels in different areas within the simulation and how the sound field changes in response to the placement of structures in the environment surrounding the product(s) (e.g., the addition of sound barriers, etc.). In another embodiment, the virtual reality system is configured to present sound quality controls that the user can manipulate to trace different sources of noise and to evaluate the effectiveness of design changes on noise suppression and/or mitigation. These and other advantageous features will become apparent in view of the present disclosure.

The various concepts introduced above and discussed in greater detail below may be implemented in any of numerous ways, as the described concepts are not limited to any particular manner of implementation. Examples of specific implementations and applications are provided for illustrative purposes.

Various numerical values herein are provided for reference purposes. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Referring now to FIG. 1, a display device 202 of a virtual reality system 200 is shown, according to at least one embodiment. The display device 202 is configured to present a 3D simulation 100 (e.g., an audio-video virtual reality simulation) of product performance for a product 102 that is positioned within a user-defined operating environment 104. In particular, the display device 202 is configured to output a 3D visualization of the product 102. In some embodiments, the display device 202 may form part of or include an audio output device to output audio that approximates the actual product performance. The 3D visualization may include images of the actual construction of the product 102, and/or a product geometry from a computer-aided design (CAD) model. In the embodiment shown, the product 102 is a generator set (e.g., genset) configured to generate electrical energy (e.g., power). The genset includes an outer enclosure 106 housing multiple sub-assemblies, including an engine system and an electric generator (e.g., an alternator, etc.). The genset may also include other noise generating subsystems such as a fan system to direct fresh air flow and/or another form of cooling system. The details of the enclosure 106 and other sub-assemblies, such as an exhaust system, muffler, fresh air ducting, doors, panels, and the like, are also included in the 3D visualization and accounted for in the computer model of the audio output. It will be appreciated that the specifications (e.g., size, type, etc.) of the product(s) 102 will vary depending on the needs of the user and the intended application. In another embodiment, the product 102 may be a truck, a recreational vehicle, a boat, a locomotive, or another type of vehicle (e.g., an on-road or off-road vehicle). In yet another embodiment, the product 102 is another form of commercial or industrial system such as a standalone engine system, a pump, a hydraulic system, or another type of system.

As shown in FIG. 1, the virtual reality system 200 is also configured to present the environment 104 surrounding the product 102 via the display device 202. The environment 104 may be adjusted based on user specifications to simulate the real-world setting in which the product 102 will be used. The environment 104 may include buildings, sound barriers, and may also include other products (e.g., separate generator enclosures, etc.) that may be used in combination. For example, in an embodiment where the genset is used to provide backup power to a hospital or another commercial facility, the environment 104 may include the building(s) powered by the genset and located in proximity to the genset enclosure 106. The position of the genset and the building, the orientation of the genset with respect to the building, and the geometry of the building are all modeled within the environment 104 of the 3D simulation.

The virtual reality system 200 is also configured to track the location of an avatar 108 (e.g., construct, simulated person, etc.) within the 3D simulation and the orientation of the avatar 108 (e.g., rotational position) with respect to the surrounding environment 104. In the embodiment of FIG. 1, the virtual reality system 200 is configured to show portions of the simulation based on a position of the avatar 108 (e.g., spatial coordinates such as X, Y, Z positions, and/or rotational position within the environment 104). The virtual reality system 200 is also configured to indicate the position of the avatar 108 within the simulation to the user via a visually-perceptible text output 110 on the display device 202. The user is thus able to perceive the position of the avatar 108 based on its relative position with respect to surrounding structures and/or the product 102.

The virtual reality system 200 is configured to generate a 3D sound field that simulates the actual sound produced by the product 102 and combine the sound field with the visual representation of the product 102 and its surrounding environment 104. In particular, the virtual reality system 200 is configured to calculate the 3D sound field within the simulation based on actual test data from the product 102 and/or one or more noise generation components within the product 102. The virtual reality system 200 is configured to provide, via an audio output device, an audio output that is representative of how the product 102 will sound in a real-world setting. The audio output is based on the position of the avatar 108 and their orientation with respect to the product 102 (e.g., their position within the 3D sound field, directionality of the sound, etc.). As shown in FIG. 1, the virtual reality system 200 may also be configured to present various acoustic parameters via a second visually-perceptible output 112 (e.g., a visually-perceptible text output, etc.) on the display device 202. The acoustic parameters may include the sound level (e.g., in decibels (dB) in one or both ears of the avatar 108), the sound pressure, sharpness, tonality, roughness, fluctuation strength, and/or other sound quality metrics.

Figure 2:
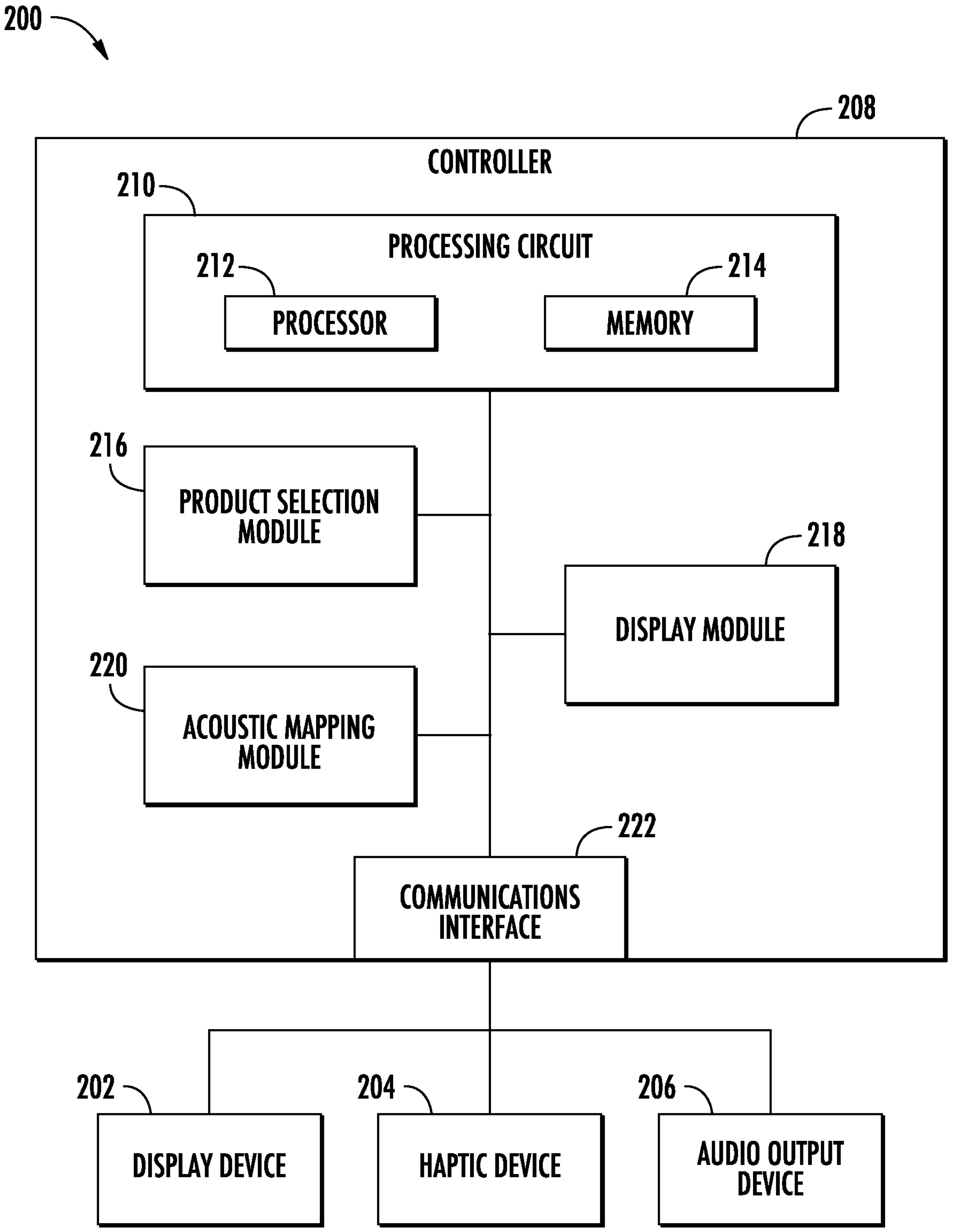
FIG. 2 is a block diagram of a virtual reality system for product analysis, according to an embodiment.

FIG. 2 shows a schematic representation of the virtual reality system 200 of FIG. 1. The virtual reality system 200 is configured to generate the 3D simulation and to allow a user to observe, navigate through, and interact with the environment 104. The virtual reality system 200 includes the display device 202, a haptic device 204, an audio output device (emitter) 206, and a controller 208. In other embodiments, the virtual reality system 200 may include additional, fewer, and/or different components.

As described with reference to FIG. 1, the display device 202 is configured to present the 3D visualization of the product 102 and the surrounding environment 104 to a user. In at least one embodiment, the display device 202 is a virtual reality headset that fits over a user's head, such as those manufactured by Oculus, Samsung, Vive, and others. The display device 202 may include a stereoscopic head-mounted display and straps with padding to secure the display comfortably onto the user's head. The display device 202 may further include sensors (e.g., gyroscopes, accelerometers, magnetometers, eye tracking sensors, etc.), structured lighting, and/or other components to enhance the user's viewing experience and to facilitate navigation through the 3D simulation. In at least one embodiment, the virtual reality headset includes goggles, glasses, a helmet, and/or another form of wearable display device. In other embodiments, the display device 202 is a computer monitor (e.g., a liquid crystal display (LCD), a light emitting diode display (LED), a touchscreen display, etc.) or another display type.

The haptic device 204 (e.g., haptic interface, user input device, etc.) is a mechanical device that mediates communication between the user and the virtual reality system 200. The haptic device 204 may be a handheld device that includes buttons, joysticks, and/or other mechanical actuators that a user can manipulate to control the position of the avatar 108 within the 3D simulation (see FIG. 1). In some embodiments, the haptic device 204 includes a motorized device (e.g., a vibration motor, etc.) that provides tactile feedback to the user in response to actions performed by the avatar 108 within the 3D simulation. For example, the haptic device 204 may vibrate in response to the avatar 108 placing its hands on the enclosure 106. The vibration level may be consistent with an actual (e.g., measured, calculated, etc.) vibration of the enclosure 106 in a real-world setting, based on the sound pressure, frequency, and material properties of the enclosure 106. In some embodiments, the display device 202 and the audio output device 206 may be integrated with the haptic device 204.

The virtual reality system 200 is configured to produce an audio output based on the position of the avatar 108 (see FIG. 1) in the simulation (e.g., with respect to the product 102, etc.). In particular, the virtual reality system 200 is configured to output the audio signal to the audio output device 206. The audio output device 206 may include headphones, a standalone speaker system, and/or another sound producing device. The audio output device 206 may be configured for stereo sound having two channels, such that the sound output to each of the user's ears may be independently controlled and to more accurately replicate the sound that a user would perceive in the real-world setting.

As shown in FIG. 2, the virtual reality system 200 also includes a controller 208 (e.g., control unit, etc.) that is structured to (i) calculate the 3D sound field from real-world test data; (ii) generate the 3D simulation; and (iii) receive data from, and transmit data to, user I/O devices. As shown in FIG. 2, the controller 208 is communicably coupled to one or more of a plurality of I/O devices (e.g., transmitter/receivers). For example, the controller 208 may be coupled to each I/O device, including the display device 202, the haptic device 204, and the audio output device 206, and is configured to control interaction between the I/O devices. The controller 208 may communicate with the I/O devices using any type or any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc.

As shown in FIG. 2, the controller 208 includes a processing circuit 210 having a processor 212 and a memory 214; an acoustic mapping module 220; a display module 218; a product selection module 216; and a communications interface 222. As described herein, the controller 208 is structured to combine visual techniques with acoustic noise source localization techniques to generate a simulation that approximates real-world performance of the product(s) 102 (see FIG. 1) in a real-world setting (e.g., an application-specific environment, etc.).

In one configuration, the acoustic mapping module 220, the display module 218, and/or the product selection module 216 are configured by computer-readable media that are executable by a processor, such as the processor 212. As described herein and amongst other uses, the modules and/or circuitry facilitate performance of certain operations to enable reception and transmission of data. For example, the modules may provide an instruction (e.g., command, etc.) to, e.g., acquire data from the I/O devices or receive data from the I/O devices. In this regard, the modules may include programmable logic that defines the frequency of acquisition of the data and/or other aspects of the transmission of the data. In particular, the modules may be implemented by computer readable media which may include code written in any programming language including, but not limited to, Java, JavaScript, Python or the like and any conventional procedural programming languages, such as the "C" programming language or similar programming languages. The computer readable program code may be executed on one processor or multiple remote processors. In the latter scenario, the remote processors may be connected to each other through any type of network.

In some embodiments, the acoustic mapping module 220, the display module 218, and/or the product selection module 216 may take the form of one or more analog circuits, electronic circuits (e.g., integrated circuits (IC), discrete circuits, system on a chip (SOCs) circuits, microcontrollers, etc.), hybrid circuits, and any other type of "circuit." In this regard, the acoustic mapping module 220, the display module 218, and/or the product selection module 216 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the acoustic mapping module 220, the display module 218, and/or the product selection module 216 may also include programmable hardware devices such as field programmable gate arrays, programmable array logic, programmable logic devices or the like. In this regard, the acoustic mapping module 220, the display module 218, and/or the product selection module 216 may include one or more memory devices for storing instructions that are executable by the processor(s) of the acoustic mapping module 220, the display module 218, and/or the product selection module 216. The one or more memory devices and processor(s) may have the same definition as provided below with respect to the memory 214 and the processor 212. Thus, in this hardware unit configuration, the acoustic mapping module 220, the display module 218, and/or the product selection module 216 may be dispersed throughout separate locations (e.g., separate control units, etc.). Alternatively, and as shown, the acoustic mapping module 220, the display module 218, and/or the product selection module 216 may be embodied in or within a single unit/housing, which is shown as the controller 208.

In the example shown, the controller 208 includes the processing circuit 210 having the processor 212 and memory 214. The processing circuit 210 may be structured or configured to execute or implement the instructions, commands, and/or control processes described herein with respect to the acoustic mapping module 220, the display module 218, and/or the product selection module 216. Thus, the depicted configuration represents the aforementioned arrangement where the acoustic mapping module 220, the display module 218, and/or the product selection module 216 are embodied as machine or computer-readable media. However, as mentioned above, this illustration is not meant to be limiting as the present disclosure contemplates other embodiments such as the aforementioned embodiment where the acoustic mapping module 220, the display module 218, and/or the product selection module 216, or at least one circuit of the acoustic mapping module 220, the display module 218, and/or the product selection module 216, are configured as a hardware unit. All such combinations and variations are intended to fall within the scope of the present disclosure.

The processor 212 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple modules and/or circuits (e.g., the acoustic mapping module 220, the display module 218, and/or the product selection module 216 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled to enable independent, parallel, pipelined, or multi-threaded instruction execution. All such variations are intended to fall within the scope of the present disclosure.

The memory 214 (e.g., RAM, ROM, Flash Memory, hard disk storage, etc.) may store data and/or computer code for facilitating the various processes described herein. For example, in some embodiments, the memory 214 is configured to store acoustic data associated with a first product (e.g., genset, etc.), a second product, etc. In some embodiments, the memory 214 is configured to store other data associated with the first product, second product, etc. For example, in some embodiments, the memory 214 is configured to store images, CAD models, etc. of the first product. In some embodiments, the memory 214 is configured to store a boundary condition including a surface geometry and/or a surface location relative to a position of the first product. In some embodiments, the memory 214 is configured to store outputs from the simulation such as contour plots based on user-specified boundary conditions, etc. The memory 214 may be communicably coupled (e.g., connected, linked, etc.) to the processor 212 to provide computer code or instructions to the processor 212 for executing at least some of the processes described herein. Moreover, the memory 214 may be or include tangible, non-transient volatile memory or non-volatile memory. Accordingly, the memory 214 may include database components, object code components, script components, or any other type of information structure for supporting the various activities and information structures described herein. In one embodiment, the non-transitory computer-readable medium is configured to store a program which, when executed by the processor 212, cause a device (e.g., the system 200, the controller 208, etc.) to perform any of the operations described herein.

The communications interface 222 may include wired and/or wireless interfaces (e.g., jacks, antennas, transmitters, receivers, transceivers, wire terminals, etc.) for conducting data communications with various systems, devices, and/or networks. For example, the communications interface 222 may include an Ethernet card and port for sending and receiving data via an Ethernet-based communications network and/or a Wi-Fi transceiver for communicating via a wireless communications network. The communications interface 222 may be structured to communicate via local area networks or wide area networks (e.g., the Internet, etc.) and may use a variety of communications protocols (e.g., IP, local area network (LAN), Bluetooth, ZigBee, near field communication, etc.). The communications interface 222 is configured to communicate with (e.g., is communicably coupled to) an I/O device. In the embodiment of FIG. 2, the communications interface 22 is configured to communicate with (e.g., transmit data to and receive data from) the display device 202, the haptic device 204, and the audio output device (emitter) 206. The communications interface 222 is configured to be communicably coupled to the processor 212.

The product selection module 216 (e.g., product configuration module, etc.) is structured to receive user selections of the product(s) and product specifications to be modeled within the 3D simulation. The product selection module 216 may include a product database stored in memory 214 that includes a listing of products for which sound data is available. For example, the product database may include a searchable lookup table that includes lists of selection criteria for various input parameters, such as the type of product, the model number of the product, the performance characteristics of the product (e.g., horsepower, etc.), and the like. The lookup table may also include lists of selection criteria that allow a user to specify a number of products and/or the subcomponents or subassemblies that make up the product. For example, the product selection module 216 may be configured to present a visually-perceptible selection pane to the user via the display device 202. In the context of a genset, the selection pane may include a first column that includes a listing of engine types for the genset, a second column that includes a listing of mufflers that can be used with the selected engine system, etc. The product selection module 216 may be structured to receive command signals from the I/O device (e.g., haptic device 204, etc.) and interpret user selections from the commands.

The display module 218 is structured to generate a visual representation of the product(s) 102 and environment 104 (see FIG. 1) for the 3D simulation. The display module 218 may be configured to receive a product selection (e.g., a product type, a product size, a product model number, etc.), a number of products, a relative position of the products, and/or other inputs from the product selection module 216. The display module 218 may also be configured to receive commands to add application-specific features (e.g., surface geometry, the location and/or size of buildings, etc.) to the environment surrounding the product(s). The display module 218 may be structured to produce a 3D visualization based on these inputs. For example, the display module 218 may include a visual data library stored in memory 214 that stores images of the product(s) and/or application-specific features that may be selected by the display module 218 based on user inputs (e.g., based on inputs from the product selection module 216). In other embodiments, the visual data library may include CAD models of the product(s) and/or application-specific features.

In yet other embodiments, the display module 218 is configured to work in coordination with the product selection module 216 to allow a user to "build" the product(s) and/or surrounding environment within the 3D simulation. For example, the display module 218 may allow the avatar

108 to pick and place components, products, and/or structures within the 3D simulation. As such, the product selection module 216 may be accessible to the avatar 108 from within the 3D simulation. In some embodiments, the display module 218 may also be structured to present visual representations of the sound field to a user. For example, the display module 218 may be structured to display contour plots of different sound metrics and/or to present text outputs that are indicative of various sound metrics at the location of the avatar 108. The display module 218 may be structured to issue commands to a graphics card and/or other graphics driver to present the selected image data and/or CAD models as images on the display device 202.

The acoustic mapping module 220 is structured to determine a sound field (e.g., a 3D sound field) based on measured sound data from real-world operation of the product 102 (see FIG. 1). For example, the acoustic mapping module 220 may be configured to receive sound data from experimental testing of a product 102 and to determine the 3D sound field using computational methods. The product selection may be received by the acoustic mapping module 220 from the product selection module 216.

In at least one embodiment, the acoustic mapping module 220 includes a sound data library (e.g., acoustic database, etc.) that stores sound data from experimental testing of a plurality of different products 102 (e.g., engine systems, gensets, vehicles, etc.). The acoustic mapping module 220 may be configured to combine (e.g., superimpose, overlay, etc.) sound data from multiple products 102 to determine the sound field resulting from the interaction between the products 102 (e.g., due to their relative position, orientation, etc.).

For example, in at least one embodiment, in a genset application, the acoustic mapping module 220 is configured to receive acoustic data associated with a first portion of a first product (e.g., a genset) and a second portion of the first product. In at least one embodiment, acoustic mapping module 220 is configured to receive a relative position of the first portion relative to the second portion. In some embodiments, the relative position is an installation position at which the second portion is installed onto the first portion. In some embodiments, a memory is configured to store the installation position. In at least one embodiment, the acoustic mapping module 220 is configured to combine the acoustic data from the first portion and the second portion based on the relative position. The acoustic mapping module 220 is configured to update the 3D surface based on the combined acoustic data from the first portion and the second portion. For example, in some embodiments, the acoustic mapping module 220 is configured to combine experimentally-measured sound data from a user-selected engine system, a user-selected cooling system, and/or a user-selected exhaust system based on their relative positions in a real-world application to generate an acoustic model to accurately simulate real-world performance.

The acoustic mapping module 220 may also be configured to apply boundary conditions to the acoustic model based on the geometry of the enclosure (e.g., based on CAD models of the enclosure geometry and relative positioning), and/or the geometry of surrounding structures in the real-world application. The acoustic mapping module 220 may be configured to overlay the 3D surface and/or sound field onto the 3D visualization generated by the display module 218 and/or to interface with the display module 218 to output sound to the audio output device 206 based on the position and/or orientation of the avatar 108 within the 3D simulation (e.g., a position and/or orientation that is determined by the display module 218). For example, the acoustic mapping module 220 may be configured to generate a control signal to each channel of the audio output device 206 that is indicative of the sound frequency, loudness, etc. at the location of at least one ear of the avatar 108 within the simulation.

Figure 3:
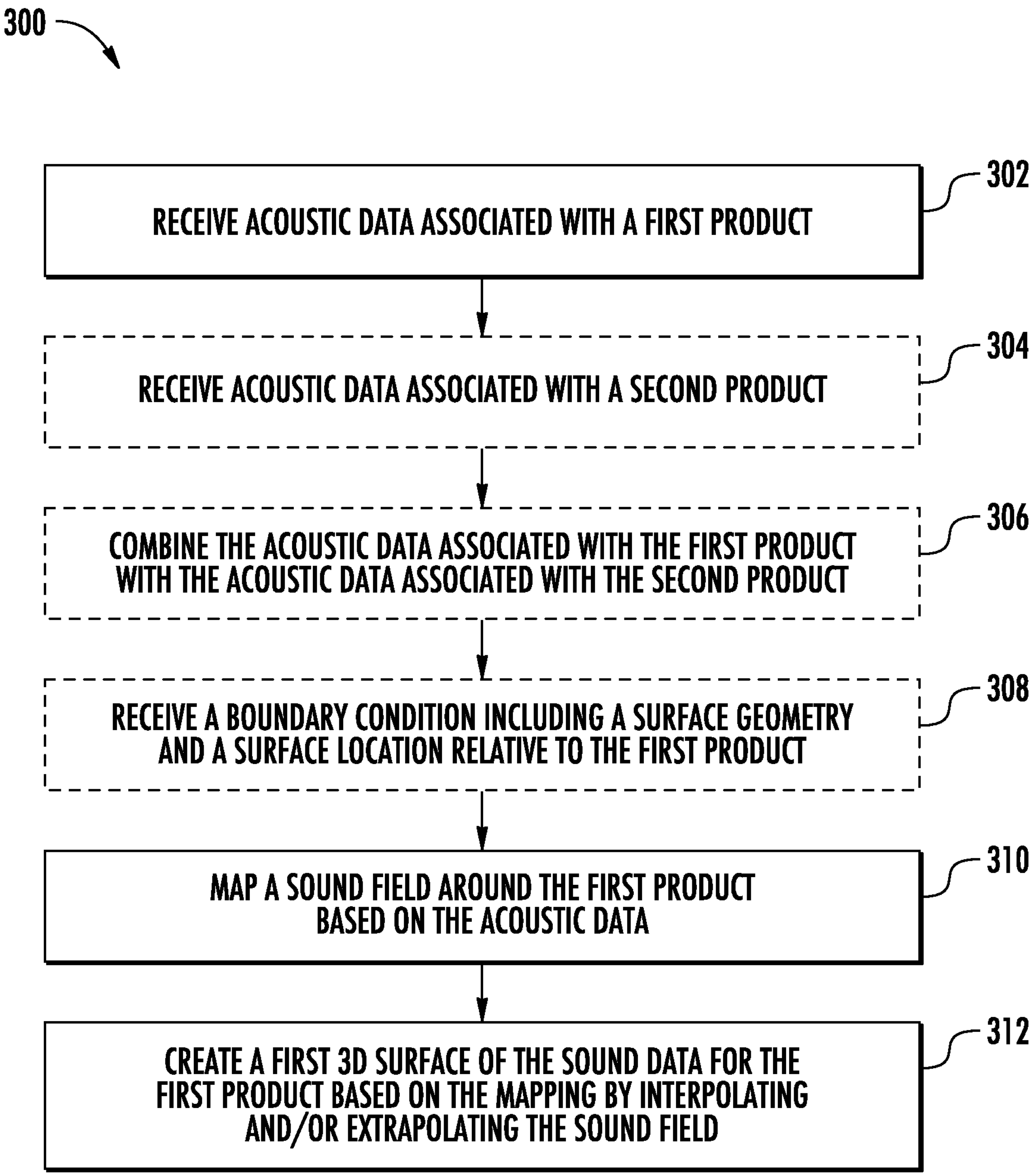
FIG. 3 is a flow diagram of a method of product visualization and acoustic noise source localization, according to an embodiment.

Referring now to FIG. 3, a method 300 of product visualization and acoustic noise source localization is shown, according to at least one embodiment. The method 300 may be implemented with the virtual reality system 200 of FIGS. 1-2. As such, the method 300 may be described with regard to FIGS. 1-2.

At 302, a controller (e.g., the controller 208, the acoustic mapping module 220, etc.) receives acoustic data that is associated with a first product. For example, in some embodiments, operation 302 includes receiving a plurality of measurements associated with a plurality of discrete locations around the first product and storing the plurality of measurements in memory (e.g., memory 214). Operation 302 may include measuring acoustic data associated with a plurality of acoustic sensors positioned in discrete locations around the first product. In some embodiments, operation 302 includes measuring acoustic data obtained from the acoustic sensors. The acoustic sensors may include an array of microphones in the form of a microphone ball that covers a 360° acoustic view around the first product. In some embodiments, the coverage may be less than 360°. For example, the microphones may be positioned around all sides of the first product, at different vertical positions (e.g., Z-axis positions) along the sides, as well as above the first product. The measurements may be taken under controlled conditions within an experimental test facility that minimizes imported noise from the environment surrounding the first product (e.g., an anechoic or semi-anechoic chamber, etc.).

Operation 302 may include measuring acoustic data associated with different operating states of the first product (e.g., engine rotational speeds, power levels, etc.). Operation 302 may also include measuring acoustic data of the noise generated by the first product when the product is configured in multiple different operating positions. For example, in a scenario where the first product is an enclosed genset, operation 302 may include collecting acoustic data in a first operating state in which the enclosure is closed off (e.g., doors shut, maintenance panels closed, etc.) and a second operating state in which the enclosure is fully open and/or in an unenclosed condition of the genset.

At 304, the controller receives acoustic data from a plurality of products that include the first product and a second product (e.g., a sub-assembly of the first product such as an engine system, cooling system, etc.), or a third product that is a variation of the first product (e.g., a genset with a different muffler type/size, etc.). Operations 302 or 304 may further include cataloging the acoustic data with an identifier (e.g., a genset model number, etc.) and storing the acoustic data in controller memory (e.g., memory 214, sound data library of the acoustic mapping module 220, etc.).

At 306, the controller combines the acoustic data from each product. In some embodiments, operation 306 includes receiving a selection (e.g., from a haptic device) of a visually-perceptible icon displayed in the simulation that identifies the second product, and in response, receiving acoustic data (e.g., from memory 214) associated with the second product to combine with the acoustic data from the first product. Operation 306 may include adding the acoustic data at each discrete sensor position from testing of the first product to the acoustic data at the same or similar sensor positions from testing of the second product. In other embodiments, operation 306 includes inputting the acoustic data from the acoustic sensors, based on their relative position with respect to the first and second product, into the acoustic simulation for further calculations.

At 308, the controller (e.g., the controller 208, the acoustic mapping module 220, the display module 218, etc.) receives a boundary condition including a surface geometry and a surface location of the boundary location relative to the position of the first product and/or second product. Operation 308 may include receiving a CAD model of the boundary feature that includes a 3D representation of the boundary, an X, Y, and Z coordinate location of the boundary condition, and/or material specifications for the boundary condition. For example, in a scenario where the boundary condition is a building that is located near the first product in the real-world application, operation 308 may include accessing a CAD model of the building from memory (e.g., memory 214), X, Y, and Z coordinates to identify the location of the building within the simulation (e.g., relative to the first product), and material properties of the outer walls of the building or average material properties of the building. Operation 308 may also include receiving fluid properties such as the average air temperature in the environment surrounding the first product.

At 310, the controller (e.g., the controller 208, the acoustic mapping module 220, etc.) maps a sound field around the first product based on the acoustic data. Operation 304 may include using computational methods to determine the sound levels (e.g., frequency, loudness, directionality, etc.) at discrete points throughout the 3D environment of the simulation. Operation 304 may include iterating through spatial and temporal points using finite element analysis to determine the sound levels at each discrete point. For example, operation 304 may include solving partial differential equations for sound pressure and velocity using a iterative numerical technique to determine the spatial and temporal distribution of sound within the 3D environment (e.g., as a function of distance from the first product, etc.). In at least one embodiment, operation 304 may include using a finite elements method (FEM) to predict the noise at different distances or positions from the object. In another embodiment, operation 304 may include using a boundary elements method (BEM) to predict the noise at different distances or positions from the object. Among other benefits, using BEM may be less computationally resource intensive than FEM. In some embodiments, operation 304 may also include determining vibration levels via a coupled structural and acoustics analysis.

At 312, the controller (e.g., the controller 208, the acoustic mapping module 220, etc.) generates a 3D surface of the sound data for the first product based on the mapping. Operation 312 may include interpolating between the discrete points determined in operation 310, and/or extrapolating values based on changes in the sound levels between the discrete points in at least one direction. The controller may use linear interpolation or a higher order interpolation or extrapolation technique to generate a continuous or semi-continuous 3D surface of the sound data (e.g., by using interpolation or extrapolation techniques to increase the resolution of the sound field from the mapping operation). For example, the 3D sound field may be generated such that changes within the sound field can be determined within a range between approximately 1 mm and 3 mm, or another suitable range depending on the desired spatial resolution of the simulation and available processing power of the controller. In at least one embodiment, the method further includes modifying the 3D surface based on user-specified boundary conditions, as will be further described.

Figure 4:
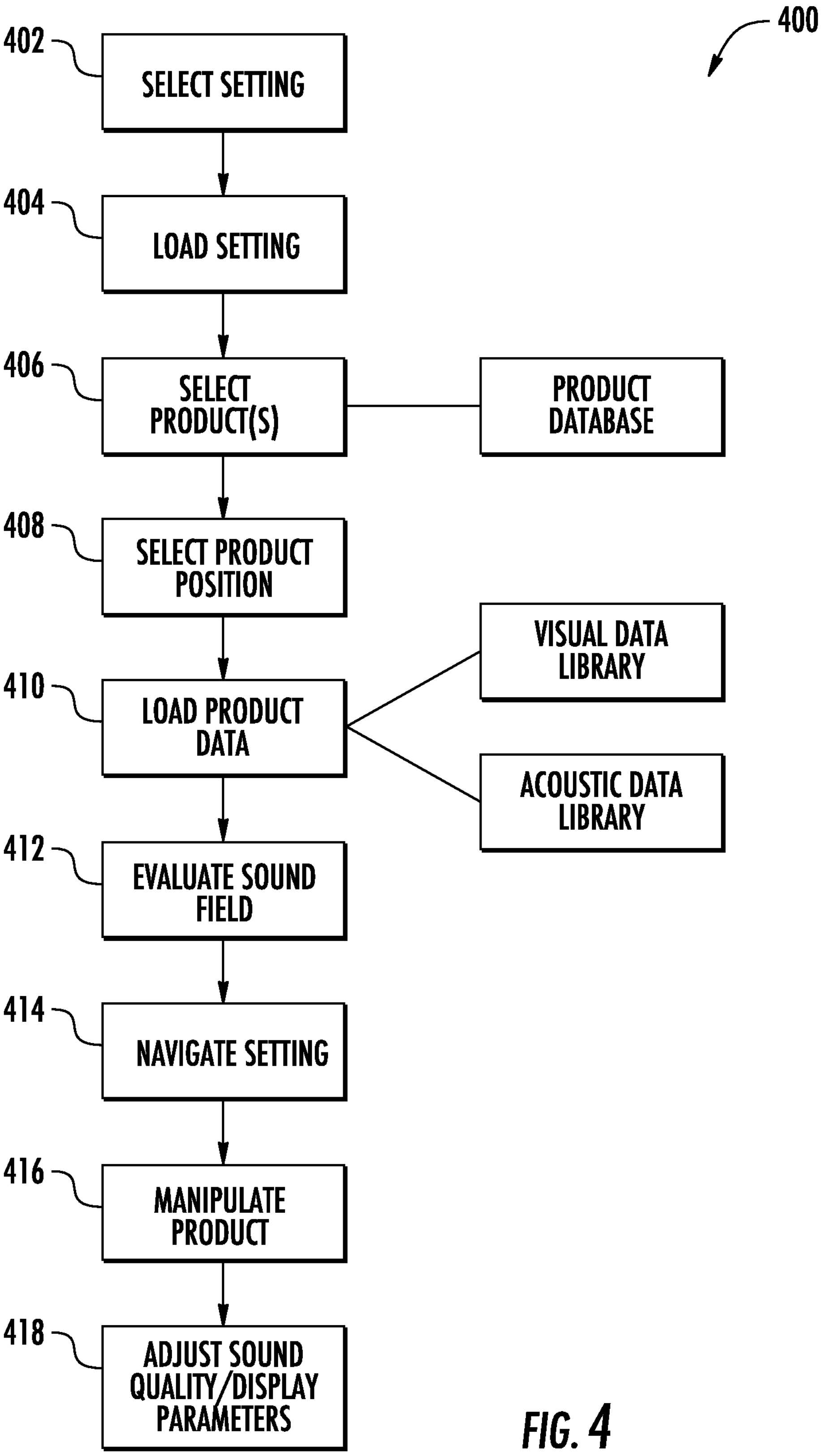
FIG. 4 is a flow diagram of a method of interacting with a virtual reality system for product analysis, according to an embodiment.

Referring now to FIG. 4, a flow diagram of a method 400 of interacting with a virtual reality system to evaluate the acoustic performance of a product is shown, according to at least one embodiment. The method 400 may be implemented with the virtual reality system 200 of FIGS. 1-2. As such, the method 300 may be described with regard to FIGS. 1-2.

At 402, the controller (e.g., controller 208) receives a setting selection from an I/O device. Operation 402 may include receiving, from a haptic device (e.g., the haptic device 204), a control signal that indicates a size of the virtual environment, an elevation of the environment, an average temperature of the environment, and/or other environmental parameters. The control signal may be produced in response to manipulation of the haptic device by a user, for example, in response to the user selecting a visually-perceptible icon that is presented to the user by the display device (e.g., the display device 202). At 404, the controller (e.g., the display module 218) loads the setting in response to the setting selection. Operation 404 may include presenting images through the display device that are representative of the desired 3D environment.

Figure 5:
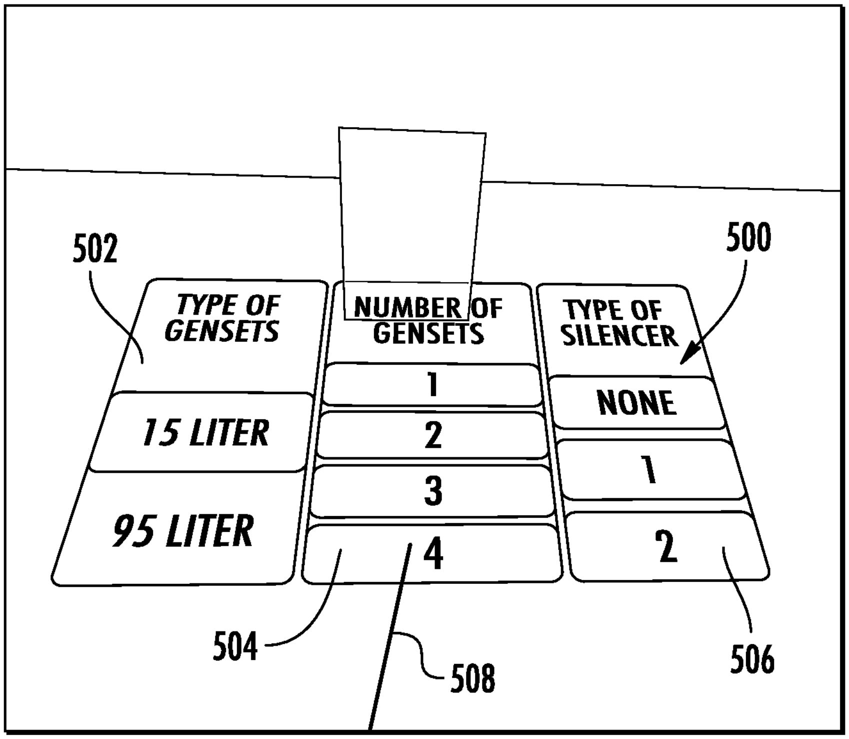
FIG. 5 is a 3D visualization of a product selection interface for a virtual reality system, according to an embodiment.
Figure 6:
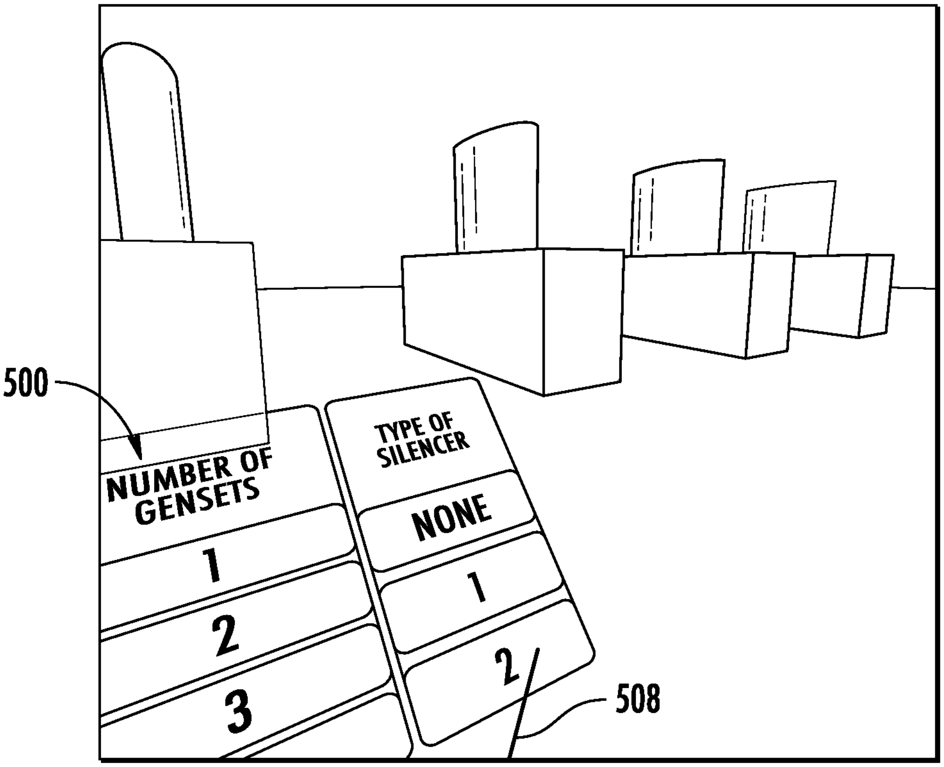
FIG. 6 is another 3D visualization of the product selection interface of FIG. 5.

At 406, the controller (e.g., the product selection module 216, etc.) receives a product selection from the I/O device. Operation 406 may include presenting to the user, via the display device, a visually-perceptible selection pane that is selectable using the haptic device. FIGS. 5-6 show an example selection pane 500 that can be implemented by the virtual reality system to facilitate product selection. As shown, the selection pane 500 includes multiple columns, each representing a different customization parameter for the product. A first column 502 allows the user to select, via the haptic device, a type of genset (e.g., an engine size, power rating, etc.). A second column 504 allows the user to select a number of gensets to include in the simulation. A third column 506 allows the user to select a type of exhaust system and/or muffler for the genset (e.g., a low-tier muffler, a mid-tier muffler, a silencer, etc.). The user may interact with and/or manipulate the selection pane using the haptic device. Such interaction and/or manipulation may include, for example, positioning a selection tool 508 (e.g., laser, etc.) within the simulation over the selection pane and manipulating an actuator (e.g., depressing a button) on the haptic device to select the desired parameter and/or product identifier from each column. As shown in FIG. 6, the virtual reality system (e.g., the display module 218) is configured to automatically update the simulation based on user selections. In some embodiments, the system may be configured so that the user can also select competitor products to compare the selected genset with at least one competitor product (e.g., to perform a virtual reality simulation with an acoustic visualization of a competitor genset).

At 408, the controller receives a product position from the I/O device. Operation 408 may include receiving spatial coordinates for each product within the simulation (e.g., an X-axis position, Y-axis position, Z-axis position, a rotational position, etc.). In other embodiments, operation 408 may include determining a desired product position and/or orientation based on user interactions with the haptic device. For example, the virtual reality system may incorporate a drag and drop feature that allows the user to manipulate the position of the product(s) within the simulation by selecting the product(s) and "walking," pulling and/or dragging the product to a new location. It will be appreciated that a similar approach to operations 406-408 may be used to receive and/or establish boundary conditions for the simulation.

At 410, the controller (e.g., the controller 208, the display module 218, the product selection module 216, etc.) loads product data based on the user selections. Operation 410 may include searching through a lookup table, based on the product identifier (e.g., by comparing the product identifier with entries in the table for each product), to locate the images and/or other file(s) and/or CAD model(s) (e.g., dimensions, sound files, etc.) associated with the product, and to obtain the sound data from experimental testing of the product.

At 412, the controller (e.g., the controller 208, the display module 218, the acoustic mapping module 220, etc.) evaluates the sound field based on the product data and product positioning. Operation 412 may be similar to operations 306 through 312 of method 300 (FIG. 3). In particular, operation 412 may include inserting the acoustic data for each product into the simulation based on the spatial coordinates and orientation of the product(s). Operation 412 may further include (i) mapping the sound field around the first product based on the acoustic data and (ii) creating a continuous or semi-continuous 3D surface of the sound data by interpolating and/or extrapolating the sound field from the mapping operation.

In some embodiments, operation 412 includes generating a simulation of the first product by combining the 3D surface with a visual representation of the first product. In at least one embodiment, operation 412 includes presenting a visual representation of the first product on the display device 202. The visual representation can include the image of the first product and/or CAD representation of the first product overlaid within a simulation space. Operation 412 may further include providing, via an audio output device, an audio output based on the position of an avatar within the simulation with respect to a position of the first product (e.g., a position of the avatar within the simulated environment). For example, operation 412 may include determining a position of a left ear and a right ear of the avatar, a directionality of the sound relative to the position and orientation of the left ear and the right ear, and generating an audio output based on the position and the directionality.

Figure 7:
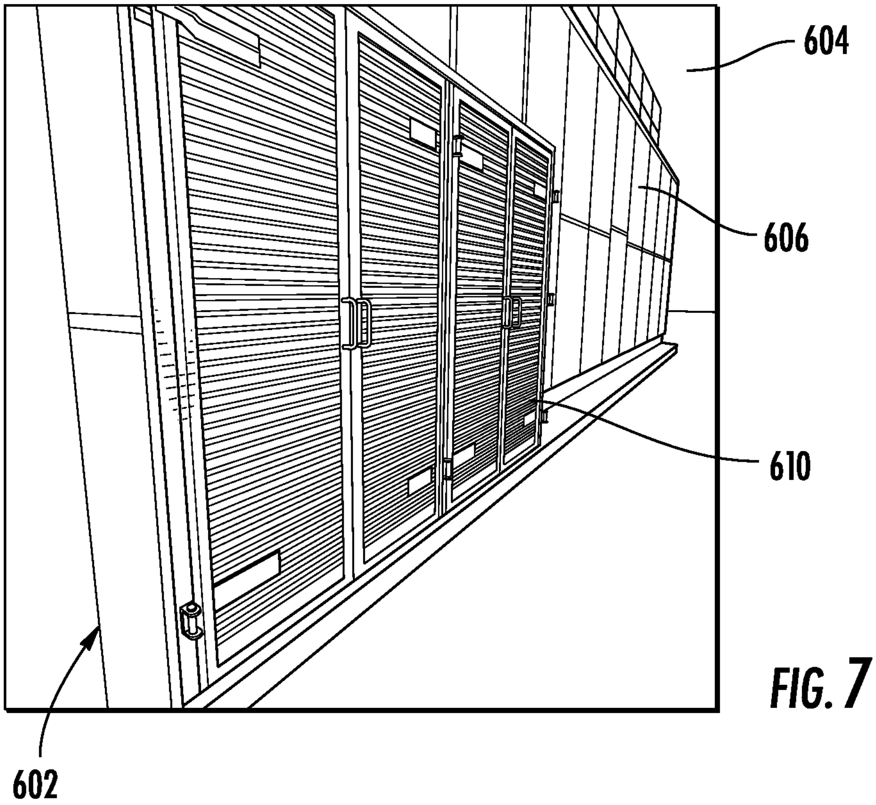
FIG. 7 is a first view from within a 3D simulation of a product, according to an embodiment.
Figure 8:
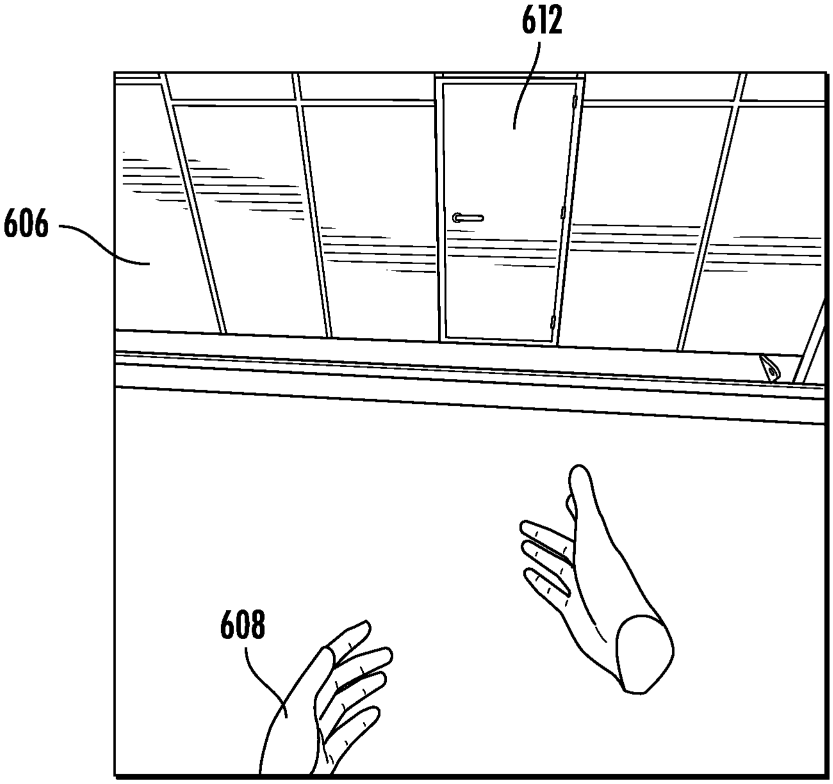
FIG. 8 is a second view from within a 3D simulation of the product of FIG. 7.

At 414, the controller (e.g., the controller 208, the display module 218, the acoustic mapping module 220, etc.) modifies a position of an avatar based on user inputs from the I/O device. Operation 414 may include receiving control signals from the haptic device and/or display device to navigate the avatar through the virtual environment. For example, FIGS. 7-8 show two different positions of the avatar 608 within the virtual environment 604, including a first position proximate to a first end of a generator set 602 (e.g., proximate to an air intake 610 for the generator set 602). FIG. 8 shows the avatar 608 as it approaches a service access door 612 of the generator set 602. The haptic device may allow a user to reposition the avatar 608 and to turn the avatar's 608 head within the simulation. The virtual reality system may also allow the user to interact with the product to reposition the avatar 608. For example, user may command the avatar 608, using the haptic device, to climb a ladder and reposition itself on top of the product or in another suitable location within the simulation. Operation 414 may further include continuously or semi-continuously updating the audio output based on the position and/or directionality of the avatar 608 (e.g., which direction the avatar 608 is facing with respect to the product(s), etc.).

Figure 9:
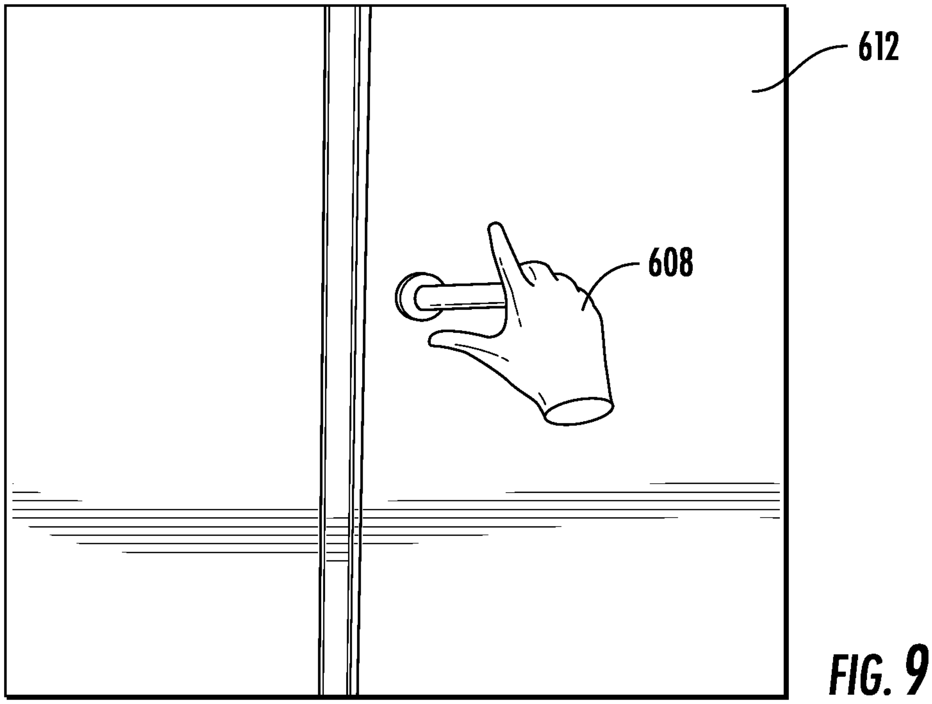
FIG. 9 is a 3D visualization of an avatar interacting with a portion of the product of FIG. 7 in a first assembly state.
Figure 10:
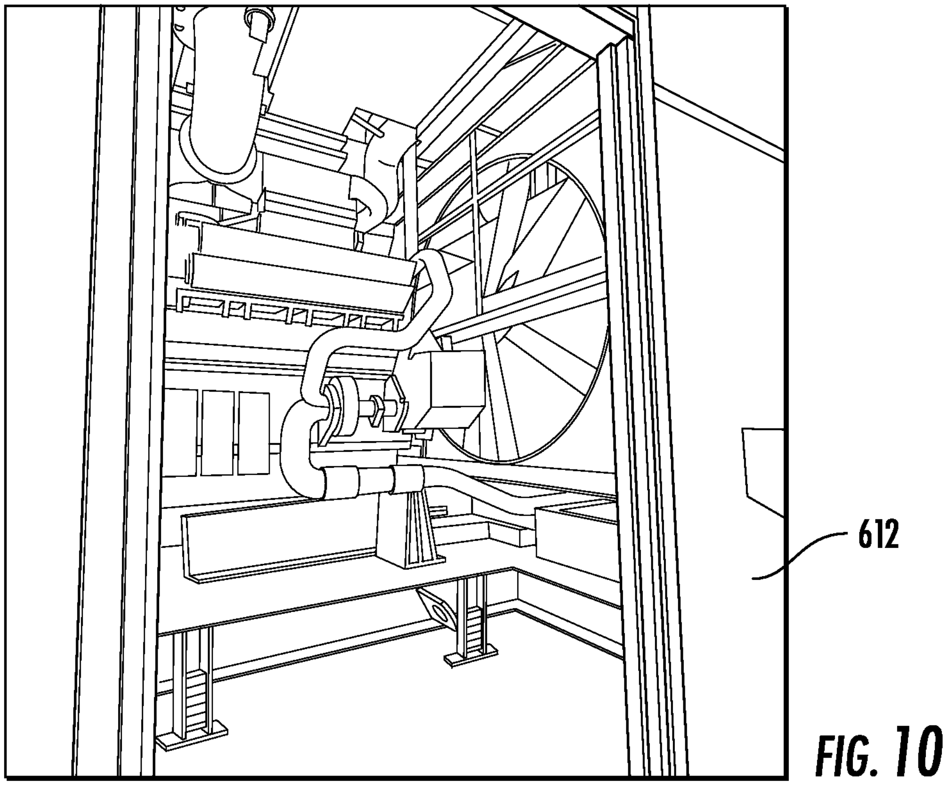
FIG. 10 is a 3D visualization of the product of FIG. 7 in a second assembly state.

At 416, the controller (e.g., the controller 208, the display module 218, the acoustic mapping module 220, etc.) manipulates a position of a portion of the first product within the simulation. Operation 416 may include receiving, from the haptic device, an indication (e.g., control signal, etc.) to manipulate the position of the portion. For example, as shown in FIG. 9, a user may use the haptic device to virtually select an access door 612, a service panel, or another movable component and to reposition the component. In the embodiment of FIGS. 9-10, the avatar 608 repositions the access door 612 from a closed position (FIG. 9) to an open position (FIG. 10). Operation 416 may include updating the simulation to animate movement of the access door 612 and to update the audio output (e.g., the 3D surface) based on a degree of movement of the portion. For example, the controller may be configured to recalculate the 3D surface (e.g., sound field) at a location of the avatar 608 by adjusting the boundary condition (e.g., a position of the boundary condition) used to represent the access door 612. In this way, the user can gain a better understanding for how the noise levels change during maintenance events, and the level of sound dampening provided by the enclosure 606. Similar interactions within the 3D simulation be used to evaluate the effectiveness of sound barriers, enclosure construction, and other parameters on the overall sound level produced by the generator set 602. In at least one embodiment, the controller may be configured to transmit a control signal to the haptic device based on calculated vibration levels at the surfaces that the avatar interacts with, which provides a more immersive experience to the user and also provides them with a better understanding of the performance of the product.

At 418, the controller (e.g., the controller 208, the acoustic mapping module 220, the display module 218, etc.) adjusts sound quality and/or display parameters within the simulation. Operation 418 may include receiving a command from the haptic device to add visual indicators of the sound level at the avatar's location within the simulation (e.g., the sound level at an ear of the avatar 108 as shown in FIG. 1). For example, in some embodiments, operation 418 includes generating a visually-perceptible icon and/or dialog box (e.g., window, etc.) that provides a visual indication of the actual sound level at a location of the avatar 108. The display module 218 is configured to represent the actual sound level as a visually-perceptible text output 112 (e.g., a sound level meter, etc.) of FIG. 1 within the dialog box. In some embodiments, the sound level corresponds to a decibel level of the sound at the location of the avatar 108. In some embodiments, the sound level includes directional information (e.g., arrows) to indicate where the sound is coming from relative to the avatar 108 (e.g., relative to an orientation of the avatar 108 with respect to the genset, etc.). The user may be able to select the dialog box and/or visually perceptible icon to obtain additional information about the sound levels within the simulation including—but not limited to—sound amplitude, frequency, measurement uncertainty, and the like.

Figure 11:
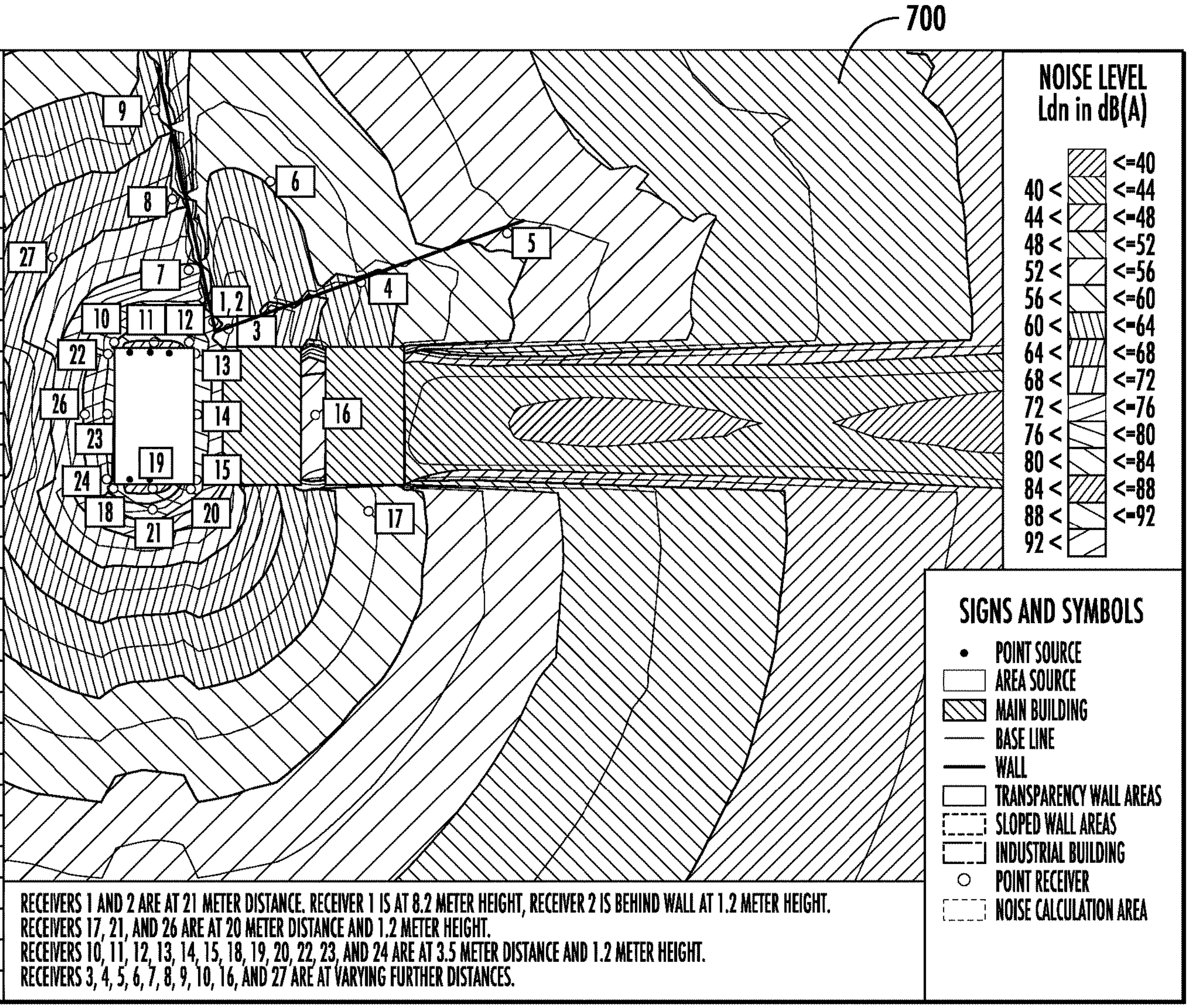
FIG. 11 is a contour plot from a 3D simulation of a product, according to an embodiment.

Operation 418 may further include generating plots to illustrate how the sound level changes with distance from the product(s) and/or between the inside and outside of an enclosure for the product(s). For example, FIG. 11 shows a visual representation of a contour plot 700 that has been overlaid onto the environment surrounding the product(s) (e.g., on the ground/floor of the simulation, etc.). The contour plot 700 identifies a change in the noise level with distance from the product. The contour plot 700 also shows how sound barriers and other environmental structures influence (e.g., reflect, attenuate, mitigate) the noise levels within the simulation. In at least one embodiment, the contour plot 700 and/or other noise level assessment tools can provide for estimations of the sound level within an uncertainty level of a certain number of decibels (for example approximately +/−3 dB). The uncertainty level may be lower depending on the accuracy of the experimental measurements and the resolution of the sound field mapping. In one embodiment, operation 418 includes transmitting the contour plot 700 of the sound data along the 3D surface (e.g., the 3D surface) to the display device.

In one embodiment, operation 418 includes overlaying the contour plot 700 onto a ground surface of the simulation. In some embodiments, the ground surface includes a portion of an office space, parking lot, neighboring houses, and/or any other environmental features or applications surrounding the genset (e.g., any environment that the genset is installed in such as an industrial environment, residential environment, data center, etc.).

Figure 12:
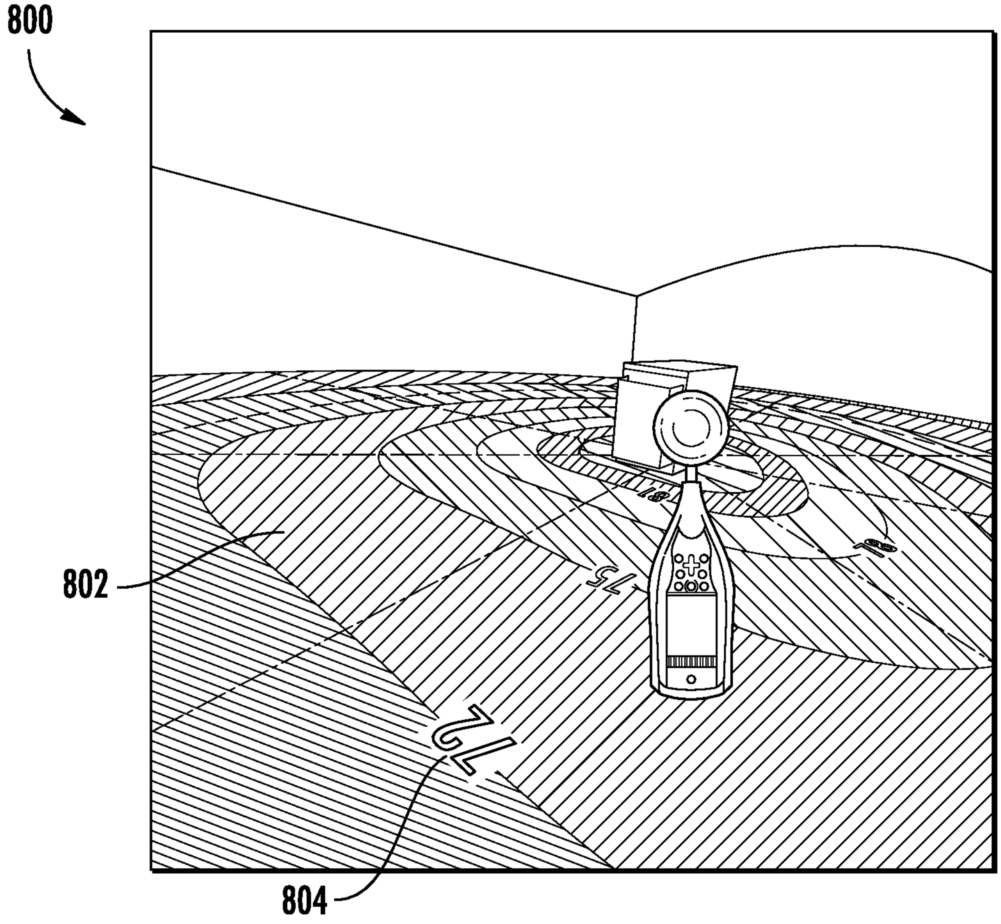
FIG. 12 is a first view from within a 3D simulation of a product, according to another embodiment.
Figure 13:
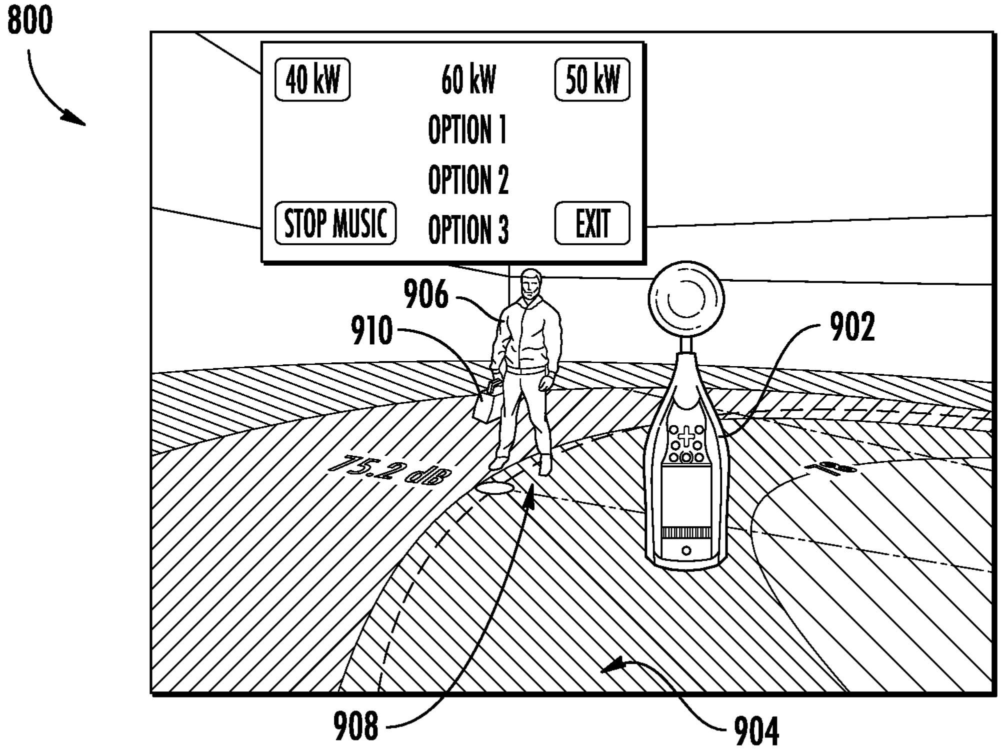
FIG. 13 is a second view from within the 3D simulation of FIG. 12.

In at least one embodiment, operation 418 includes displaying (e.g., via the display device 202 of FIG. 2) a visual representation of the simulation including the contour plot so that a user is able to navigate across the contour plot in response to inputs from a haptic device (e.g., the haptic device 204 of FIG. 2). For example, FIG. 12 shows a graphical display screen for a simulation in which a genset is positioned within an acoustic chamber. A contour plot 800 of the sound levels within the chamber is overlaid onto a floor of the chamber. The contour plot 800 is shown to include bands 802 (e.g., colorbars, etc.) representing different intervals of sound. The contour plot 800 can also display the approximate sound level, for example, via text display 804 at the borders of each band 802 to inform the user of the sound levels in the area they are standing or otherwise positioned at. Representing the contour plot 800 on the ground surface of the simulation permits a user to visually observe changes in the sound level as they reposition the avatar 108 relative to the genset. In some embodiments, the contour plot 800 is user-selectable such that a user can access and adjust display parameters for the contour plot 800 within the simulation (e.g., the number of contours, the resolution, the colors used to represent different sound level ranges, etc.).

In at least one embodiment, operation 418 includes providing an indication of how sound from the genset (e.g., from the genset itself and/how the gensets interaction with the surrounding environment) can affect a human conversation, or otherwise impact discussions between individuals at different positions relative to the genset. For example, as shown in FIG. 12, operation 418 can include receiving, by a first avatar 902 at a first position 904 within the simulation 900 a sound input (e.g., a voice input) from a second avatar 906 at a second position 908 within the simulation that is different from the first position. In some embodiments, the sound input is sound (e.g., a user's voice) from a microphone for the second avatar 966 that is directed out of the second avatar's mouth. In another embodiment, the sound input can be a sound from a virtually represented device. For example, in FIG. 12, the sound input is a sound generated by a boombox 910 (e.g., portable sound system, stereo, etc.) that is held by the second avatar 966. The second avatar 966 can move around within the simulation to reposition the sound input. In some embodiments, the second avatar 966 is controlled by a second user through a second haptic device.

The resulting sound input is modifiable based on sound from the genset and based on details of the surrounding environment to simulate how a person's voice would actually be affected by the surrounding environment. Operation 418 can include modifying the sound input based on the 3D surface (e.g., the sound from the first product including the effects of the surrounding environment) to simulate how the sound input would actually be affected by the sound field around the first product and/or the surrounding environment. The operation 418 includes outputting the modified sound input to the first avatar, through speakers of the haptic device for the first avatar. In other words, two users, via their avatars, can speak to one another within the simulation, and their headsets will feedback the actual sound that the user would hear (including any genset contamination of the sound).

In at least one embodiment, operation 418 includes modifying the audio output; for example, by presenting sound quality and/or modification controls that the user can manipulate within the simulation. The sound controls can be used to modify the frequency (e.g., frequency suppression) for tracing noise sources and/or to enhance the sound quality. The sound controls can also be used to modify the loudness, sharpness, tonality, roughness, fluctuation strength, or any other calculated sound quality parameter. In at least some embodiments, these controls facilitate virtual reality led design of the product for the final application, by allowing the user to observe the impact of design changes made within the simulation. In some embodiments, operation 418 further includes inserting virtual constructs and/or manufactured artifacts (e.g., sound generators, etc.) into the model, in place of more complex structures, to reduce modeling complexity and allow for lower order approximations.

Among other benefits, the virtual reality system of the present disclosure provides a tool that a product manufacturer, supplier or other party can use to accurately simulate the performance of products in a real-world setting. The system can be used to represent and demonstrate product performance to another party or parties (e.g., a target audience, such as customers) without forcing the party or parties into the field, and allows a manufacturer to iterate through design changes before installation of the product into its end-use environment. The virtual reality system can also be used to tailor products to meet user specifications, without undue experimentation in a test facility.

For the purpose of this disclosure, the term "coupled" or "communicated" may mean the joining or linking of two elements directly or indirectly to one another. Such joining may be wired or wireless in nature. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various modules and/or circuits with particular functionality are shown in FIG. 2, it should be understood that the controller 208 may include any number of modules and/or circuits for completing the functions described herein. For example, the activities and functionalities of the acoustic mapping module 220, the display module 218, and/or the product selection module 216 may be combined in multiple modules and/or circuits or as a single module and/or circuit. Additional modules and/or circuits with additional functionality may also be included. Further, it should be understood that the controller 208 may further control other activity beyond the scope of the present disclosure.

As mentioned above and in one configuration, the "modules" may be implemented in machine-readable medium for execution by various types of processors, such as processor 212 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

It should be appreciated that the processor 212 is configured to perform any of the operations described herein (e.g., any of the operations described with reference to the method 300 of FIG. 3, the method 400 of FIG. 4, etc.). While the term "processor" is referenced above, it should be understood that the term "processor" and "processing circuit" may be used to refer to a computer, a microcomputer, or portion thereof. In this regard and as mentioned above, the "processor" may be implemented as one or more application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use(s) contemplated. Other substitutions, modifications, changes and omissions may be made in the design, operating conditions and arrangement of the embodiments without departing from the scope of the present disclosure as expressed in the appended claims.

What is claimed is:

1. A method for product visualization and noise source localization using acoustic data, the method comprising:

receiving acoustic data associated with a first product;

mapping a sound field around the first product based on the acoustic data;

generating a three-dimensional (3D) surface of the sound field for the first product based on the mapping by at least one of interpolating or extrapolating the sound field;

generating a simulation of the first product by combining the 3D surface with a visual representation of the first product; and providing, via an emitter, an audio output based on a position of an avatar in the simulation with respect to a position of the first product.

2. The method of claim 1, wherein receiving the acoustic data comprises receiving a plurality of measurements associated with a plurality of acoustic sensors positioned in discrete locations around the first product.

3. The method of claim 1, further comprising:

receiving a selection of a visually-perceptible icon displayed in the simulation, the visually-perceptible icon identifying a second product;

receiving acoustic data associated with the second product; and combining the acoustic data associated with the first product with the acoustic data associated with the second product within the simulation.

4. The method of claim 1, further comprising:

receiving a boundary condition including a surface geometry and a surface location relative to the position of the first product; and modifying the 3D surface based on the boundary condition.

5. The method of claim 1, further comprising:

modifying the position of the avatar within the simulation from a first position to a second position based on input from a haptic device; and updating the audio output based on a change in the sound field along the 3D surface between the first position and the second position.

6. The method of claim 1, wherein generating the simulation comprises displaying, via a display device, a contour plot of sound data along the 3D surface.

7. The method of claim 6, wherein displaying the contour plot comprises overlaying the contour plot onto a ground surface of the simulation and displaying, via the display device, a visual representation of the simulation so that a user may navigate across the contour plot in response to inputs from a haptic device.

8. The method of claim 6, wherein displaying the contour plot further comprises displaying a plurality of bands representing different intervals of sound, and displaying an approximate sound level, via a text display along the contour plot, that is associated with at least one band of the plurality of bands.

9. The method of claim 1, further comprising:
receiving acoustic data associated with a first portion of the first product;
receiving acoustic data associated with a second portion of the first product and a relative position of the second portion; and
updating the 3D surface by combining the acoustic data from the first portion and the acoustic data from the second portion based on the relative position.

10. The method of claim 1, further comprising:
receiving, at a first position within the simulation, a sound input from an avatar at a second position within the simulation; and
modifying the sound input based on the 3D surface to simulate how the sound input would actually be affected by the sound field around the first product.

11. The method of claim 10, further comprising outputting the modified sound input as received at a second position that is different from the first position.

12. The method of claim 1, further comprising:
generating a visually-perceptible output presenting an acoustic parameter; and
displaying, via a display device, the simulation including the visual representation of the first product and the visually-perceptible output.

13. The method of claim 1, further comprising:
receiving, from a haptic device, an indication to manipulate a position of a portion of the first product within the simulation;
in response to the indication, displaying movement of the portion; and
modifying the 3D surface based on a degree of movement of the portion.

14. The method of claim 1, wherein the simulation is an audio-video virtual reality simulation.

15. A system for virtual product review and analysis, the system comprising:
a communications interface configured to communicate with an emitter;
a memory configured to store acoustic data associated with a first product; and
a processor communicably coupled to the communications interface and the memory, the processor configured to:
receive acoustic data associated with a first product;
map a sound field around the first product based on the acoustic data;
generate a three-dimensional (3D) surface of the sound field for the first product based on the mapping by at least one of interpolating or extrapolating the sound field; and
generate a simulation of the first product by combining the 3D surface with a visual representation of the first product,
wherein the emitter is configured to provide an audio output based on a position of an avatar in the simulation with respect to a position of the first product.

16. The system of claim 15, wherein the memory is configured to store a boundary condition including a surface geometry and a surface location relative to the position of the first product, wherein the processor is further configured to modify the 3D surface based on the boundary condition.

17. The system of claim 15, further comprising a display device that is communicably coupled to the communications interface, the display device configured to present a 3D simulation of product performance, wherein the processor is further configured to transmit to the display device a contour plot of sound data along the 3D surface.

18. The system of claim 15, further comprising an I/O device communicably coupled to the communications interface, wherein the I/O device includes at least one of a haptic device or a virtual reality headset.

19. The system of claim 18, wherein the virtual reality headset comprises a stereoscopic head-mounted display.

20. A non-transitory computer-readable medium configured to store a program which, when executed by a processor causes a device to perform the method of claim 1.

* * * * *